United States Patent
Frankel et al.

(10) Patent No.: US 10,448,740 B1
(45) Date of Patent: Oct. 22, 2019

(54) SPRING-LOADED LEG ROCKING CHAIR

(71) Applicant: Zenithen USA LLC, Upland, CA (US)

(72) Inventors: Andrew David Frankel, Yorba Linda, CA (US); Shi-Ping Zheng, Fuzhou (CN); Tian-Xia Zheng, Fujian (CN)

(73) Assignee: Zenithen USA, LLC, Upland, CA (US)

( * ) Notice: Subject to any disclaimer, the term of this patent is extended or adjusted under 35 U.S.C. 154(b) by 0 days.

(21) Appl. No.: 15/950,206

(22) Filed: Apr. 11, 2018

(51) Int. Cl.
  *A47C 3/02* (2006.01)
  *A47C 4/28* (2006.01)
  *A47C 3/025* (2006.01)
  *F16F 1/08* (2006.01)

(52) U.S. Cl.
  CPC .............. *A47C 3/025* (2013.01); *F16F 1/08* (2013.01)

(58) Field of Classification Search
  CPC .................................... A47C 3/025; F16F 1/08
  USPC ...... 297/23, 42, 45, 56, 260.1, 271.5, 272.1; 248/599, 618, 624; 267/166.1, 174
  See application file for complete search history.

(56) References Cited

U.S. PATENT DOCUMENTS

| | | | |
|---|---|---|---|
| 244,104 A * | 7/1881 | Andrews | A47C 3/029 297/272.1 X |
| 405,919 A * | 6/1889 | Straus et al. | A47C 3/029 297/133 |
| 1,219,068 A * | 3/1917 | Bennett | A47C 3/029 297/272.1 X |
| 1,317,580 A * | 9/1919 | Kanode | A47C 3/029 297/272.1 |
| 3,114,572 A * | 12/1963 | Hopkins | A47C 3/029 297/133 |
| 3,225,365 A * | 12/1965 | Miller | A47D 9/04 5/109 |
| 3,886,608 A * | 6/1975 | Casella | A47C 3/029 297/260.2 |
| 4,047,753 A * | 9/1977 | Uchida | A47C 3/029 297/271.6 X |
| 4,126,353 A * | 11/1978 | Clough | A47C 3/029 297/272.1 X |
| 4,793,010 A * | 12/1988 | Gross | A47D 9/04 5/105 |
| 4,985,949 A * | 1/1991 | Jantz | A47D 1/08 5/107 |
| 4,987,624 A * | 1/1991 | Nafti | A47D 9/02 5/109 |
| 5,702,152 A * | 12/1997 | Shaw | A47C 3/029 297/271.6 X |
| 5,860,698 A * | 1/1999 | Asenstorfer | A47D 9/04 297/260.2 X |
| 5,873,624 A * | 2/1999 | Simpson | A47C 4/283 297/45 X |
| D411,763 S * | 7/1999 | Asenstorfer | D3/213 |

(Continued)

*Primary Examiner* — Rodney B White
(74) *Attorney, Agent, or Firm* — Merek, Blackmon & Voorhees, LLC

(57) ABSTRACT

A spring-loaded leg is shown along with a compatible rocking chair having the spring-loaded leg. The spring-loaded leg is composed of a lower cap, housing, spring and connection member. The connection member passes through the housing slide groove and is situated over the upper end of the housing spring. When connected to the chair frame, the spring-loaded leg provides a spring-like capacity for the frame and in combination with the fulcrum point of the support section, provides a controlled swinging or rocking motion for the chair.

5 Claims, 7 Drawing Sheets

(56) References Cited

U.S. PATENT DOCUMENTS

| | | | | |
|---|---|---|---|---|
| 6,382,729 B1* | 5/2002 | Wu | A47C 4/286 | 297/16.2 |
| 6,439,656 B1* | 8/2002 | Liu | A47C 3/029 | 297/272.1 X |
| 7,073,852 B1* | 7/2006 | Zheng | A47C 4/286 | 297/16.2 |
| 7,100,975 B1* | 9/2006 | Zheng | A47C 3/029 | 297/45 X |
| 7,325,872 B2* | 2/2008 | Basu | A63G 13/02 | 297/271.5 X |
| 7,493,666 B2* | 2/2009 | Mitchell | A47D 9/04 | 5/108 |
| 7,537,285 B2* | 5/2009 | Stewart | A47C 3/029 | 297/260.1 X |
| 7,717,502 B2* | 5/2010 | Deng | A47C 4/20 | 297/45 X |
| 8,696,052 B2* | 4/2014 | Zhu | A47C 4/28 | 297/45 X |
| 8,955,904 B1* | 2/2015 | Zhu | A47C 4/28 | 297/16.1 |
| 9,060,611 B2* | 6/2015 | Grace | A47C 3/0255 | |
| 9,282,824 B2* | 3/2016 | Grace | A47C 3/0255 | |
| 9,795,217 B2* | 10/2017 | Grace | A47C 7/70 | |
| 2003/0168557 A1 | 9/2003 | Semienko | | |
| 2004/0207236 A1* | 10/2004 | Chen | A47C 4/286 | 297/45 |
| 2004/0212224 A1* | 10/2004 | Chen | A47C 4/286 | 297/56 |
| 2004/0245810 A1* | 12/2004 | Tseng | A47C 4/50 | 297/56 |
| 2009/0200846 A1* | 8/2009 | Yehuda | A47D 9/04 | 297/271.5 |
| 2012/0216347 A1* | 8/2012 | Tundo | A47C 3/02 | 297/260.1 X |
| 2015/0282625 A1 | 10/2015 | Grace | | |

* cited by examiner

SPRING-LOADED LEG ROCKING CHAIR

BACKGROUND OF THE INVENTION

Field of the Invention

The invention belongs to the field of chairs, and particularly is to spring-loaded legs and a rocking chair. Specifically, the spring-loaded legs are affixed to the grounded portion of the chair frame, which allows for the rocking motion of the chair to be achieved.

Technical Background

The rocking chair is a common leisure device equipped with rocking functionality but is typically designed by means of arc-shaped bar members rocking back and forth on the floor. The rocking chair in and of itself is always in an unstable state, thereby making it only suitable specifically for leisure. For this reason, the industry has made improvements to its defects so that the rocking chair can work in both a stable as well as a rocking state.

For example, U.S. published patent application number US20150282625A1 consists of a collapsible and portable rocking chair designed with a collapsible chair frame. The chair frame is comprised of a pair of frame side assemblies connected by means of cross-members and supported by a backrest; the backrest and seat cushion are correspondingly supported by the forward and rear leg portions and the chair support bars.

The pair of side frame assemblies are comprised of forward and rear leg portions, which are supported in the rear on a fulcrum point, which serves to facilitate the forward and backward swinging of the chair at the point of the fulcrum.

At least one rocker mechanism is attached to each frame side assembly to support the chair during movement along the forward and rearward positions.

The rocker mechanism is composed of a tubular extension member, a spring and a sleeve, and is actually a standard torsion spring or a gas spring. The overall structure is relatively long. To compensate for such, the upper end is required to be situated on the hinged portion of the rear leg members and the backrest support member, while the lower end is hinged to the slide rail on the ground. Only then can the device operate properly.

The patent publication description also provides another example of a rocker mechanism. This rocker mechanism consists of only a sleeve housing and a compression spring built into the sleeve housing. The front and rear leg assemblies of the rocking chair are directly connected by a spring, which allows for the lower ends of the leg structures along with the housings to achieve an expanding function. However, this structure is actually difficult to achieve. The leg members of the chair oscillate back and forth at the point of the fulcrum in an arc-like fashion. The angle of each leg members is always changing. The lower end of the sleeve housing is restricted to the ground, therefore it is difficult to follow the change of the angle of the leg members in a timely manner, and the lower ends of the leg members get stuck in the inner walls of the sleeve housing. It has no way of operating properly and either loses its back-and-forth swinging motion or the swinging is not sufficiently smooth.

The main objective of this invention to provide a spring-loaded leg suitable for any chair to achieve a rocking function, as well as a compatible rocking chair.

SUMMARY OF THE INVENTION

The object of the present invention is to design a spring-loaded leg in which a spring is placed within a housing chamber, with the housing connector attached to the chair frame and sliding along the housing slide groove; and the design of a rocking chair fitted with the aforesaid spring-loaded legs.

The technical proposal of the invention is achieved in the following way:

A type of spring-loaded leg with special attributes, including the following:

A lower cap;

A housing comprised of a chamber opening and a slide groove, with said slide groove running parallel to the central axis of the chamber;

A spring placed in the housing chamber and secured into the housing chamber by means of the lower cap;

A connecting member comprised of a foot sheath, a connector and a spring cap, the three of which form an interconnected structure. The spring cap is located in the housing chamber and is situated on the top of the spring; the connector passes through the slide groove; and the foot sheath can be secured onto the chair frame to form an spring-like support.

The aforesaid lower cap has outer lips that secure to the housing, and a protrusion is formed on the center portion of the housing. The lower end of the spring is then inserted onto the protrusion to maintain the centering of the structure. The connector portion of the connecting member is inserted into the housing slide groove and the housing itself is placed upside down over the upper end of the spring. The lower end of the housing is fitted into the lower cap and is fastened by screws.

The aforementioned spring is conical in shape, and the housing chamber is correspondingly a conical structure, at least in the upper portion of the chamber where the spring is affixed to the spring cap. There is sufficient space within the housing to allow the spring to expand and contract.

The aforementioned spring cap of the connecting member is formed into an inverted concave portion, which fastens onto the top of the spring.

The slide groove located on the aforementioned housing is formed on both sides with a protruding lip guide.

A type of rocking chair is composed of a chair frame and soft seat fabric. The chair frame has four sides, with the left and right side assemblies supported by means of corresponding or symmetrical bars. The two side support assemblies are interconnected by means of connecting components, which can serve to facilitate the opening and closing of the chair frame. The aforementioned seat fabric is supported by the support section of the chair frame; special characteristics include the following:

It also includes the following:

The aforementioned spring-loaded leg comprised of a lower cap, housing, spring, and connection member;

The chair frame always has ground support on one end of the chair due to the spring-loaded legs, whether it be on the front end or the back end, or on the front or back end of each of the support sections on each side. The chair frame is attached to the foot sheaths of the spring-loaded legs.

The fulcrum assembly having a rotation point located in the middle of the support sections on both sides. It provides support for the chair frame and allows the chair frame to oscillate back and forth on the fulcrum.

The aforementioned support section includes a front leg bar and a rear leg bar connected diagonally by intersecting bars forming an x-shaped hinge joint to the opposing front leg bar and the rear leg bar. The spring-loaded legs are affixed at the lower end of at least one of the front leg bars and the rear leg bars, or is affixed to the connecting component attached to the lower ends of the rear leg bards. The fulcrum assembly is composed of two short bars hinged together, with the end of one short bar affixed the front leg bar, and the other affixed to the corresponding rear leg bar, thereby forming a quadrangular structure with the front and rear leg bars. The opposing ends of the short bars are affixed to the fulcrum point, which allows for the rocking movement of the chair frame.

The aforementioned support section is comprised of a front leg bar and a rear leg bar; the middle portion of the front leg bar locks into a slide housing, into which the rear leg bar is inserted, thereby forming an intersecting x-shaped structure. The spring-loaded legs are attached to lower sections of either the front leg bar or rear leg bar, or they are affixed to the lower portion of the two rear leg bars of the connecting component on both sides. The fulcrum assembly is composed of a vertical bar, and this vertical bar is hinged onto the upper middle portion of the front leg bar, and the hinge piece is also attached to the near end of the vertical bar and hinged lower on the front leg bar, thereby forming a triangular structure. Alternatively, the upper end of the vertical bar can be hinged onto the plastic pad of the front leg bar, which limits the angle in which the vertical bar opens. When in the open position, the aforementioned vertical bar is perpendicular to the floor, with the lower end forming a swinging fulcrum, which supports the swinging or rocking of the chair frame.

The aforementioned support section is comprised of the front leg bar, rear leg bar, cushion bar and ground bar, and these four components form a rectangular frame. The spring-loaded legs are attached to the ground bars on either the front or rear sides. The fulcrum assembly consists of a plastic pad, which is riveted onto the middle section of the ground bar, and it is this rivet point that serves to facilitate rotation at the point of the fulcrum.

The aforementioned support section consists of a D-shaped structure composed of the back rest bar, cushion bar and the ground bar; the spring-loaded legs are affixed to at least one of the ground bars on the front or rear side, or they are affixed to the rear portion of the connecting component on both facades. The fulcrum assembly consists of a plastic pad, which is riveted onto the middle section of the ground bar, and it is this rivet point that serves to facilitate rotation at the point of the fulcrum.

The present invention skillfully utilizes the design of a housing, slide groove and connection member combination to provide connection to and spring action for the chair frame. Furthermore, the spring and spring cap portion of the connection member along with the space contained within the housing chamber can facilitate the rocking of the chair, especially due to the conical shape of the spring, which provides a centering and guiding force. The foot sheath on the connection member is compatible with any type of chair frame and provides a spring-like support especially when combined with the fulcrum point, which allows for the rocking motion of the chair frame. Additionally, this type of rocking function facilitates a center of gravity for the frame and allows for the rocking chair to rock in a controllable manner.

Figure 1:
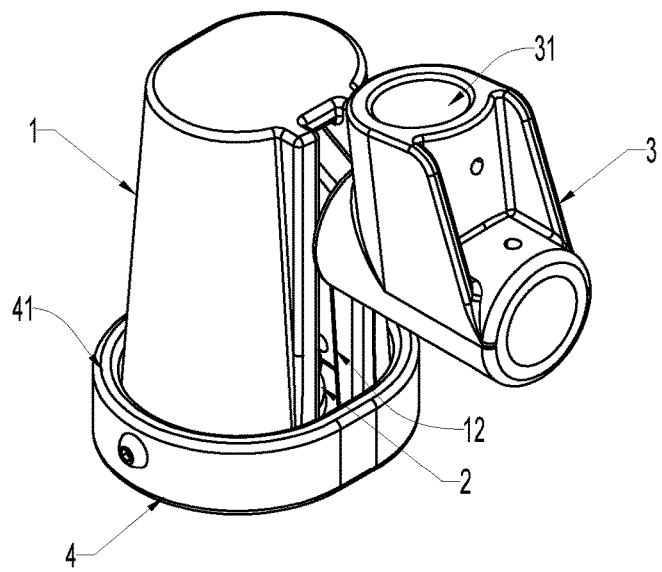
FIG. 1 is a diagram of a spring-loaded leg.

Similar reference characters denote corresponding features consistently throughout the attached drawings. Namely, in the drawings the following reference numbers refer to the following part:
1—housing
11—chamber
12—slide groove
13—lip guide
2—spring
3—connection member
31—foot sheath
32—connector
33—spring cap
331—inverted concave portion
4—lower cap
41—cap lip
42—protrusion
43—screw
5—seat fabric
6—support section
61—front leg bar
611—slide housing
62—rear leg bar
63—cushion bar
64—ground bar
7—fulcrum assembly
71—plastic pad
72—short bar
73—vertical bar
74—hinge piece
8—connecting component

DETAILED DESCRIPTION OF THE PREFERRED EMBODIMENT(S)

Figure 2:
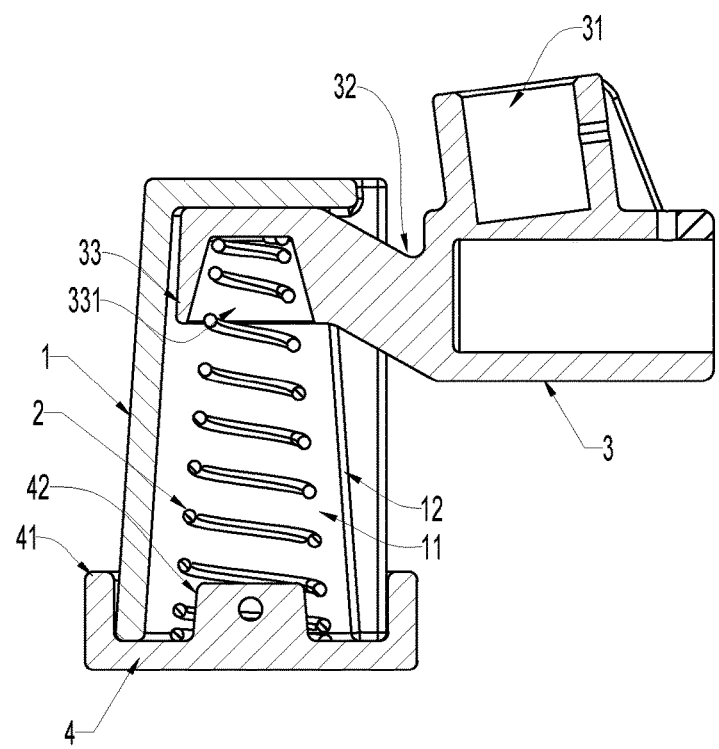
FIG. 2 is a cross-sectional view of spring-loaded leg.
Figure 3:
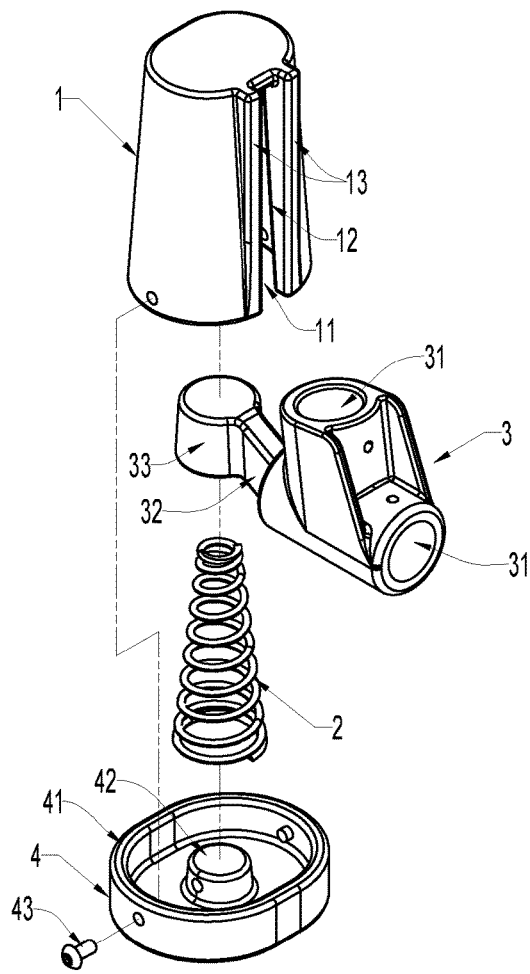
FIG. 3 is an exploded view of separate components of spring-loaded leg.

Referring to FIGS. 1, 2 and 3, a spring-loaded leg comprises a housing 1, a spring 2, a connection member 3 and a lower cap 4.

The housing 1 includes a chamber 11 opening and a slide groove 12, with said slide groove 12 running parallel to the central axis of the chamber 11, and protruding lip guides 13 running along both sides of the slide groove. The lower cap 4 has cap lips 41 that secure to the housing, and a protrusion 42 is formed on the center portion of the housing. The lower end of the housing 1 is fitted onto the cap lip 41 and is fastened by screws, which then allows the spring 2 contained in the housing chamber 11 to remain firmly in place in the housing 1 and allows the spring to expand and contract in an upward and downward motion in the chamber 11.

The connecting member 3 is comprised of a foot sheath 31, a connector 32 and a spring cap 33, the three of which form an interconnected structure. The spring cap 33 is located in the housing chamber 11 and is situated on the top of the spring 2, the connector 32 passes through the slide groove 12, and the foot sheath 31 can be secured onto the chair frame to form a spring-like support. To this end, the foot sheath 31 may be placed in either a horizontal or vertical position, which allows for vertical or horizontal members of the chair frame to be inserted accordingly.

Figure 4:
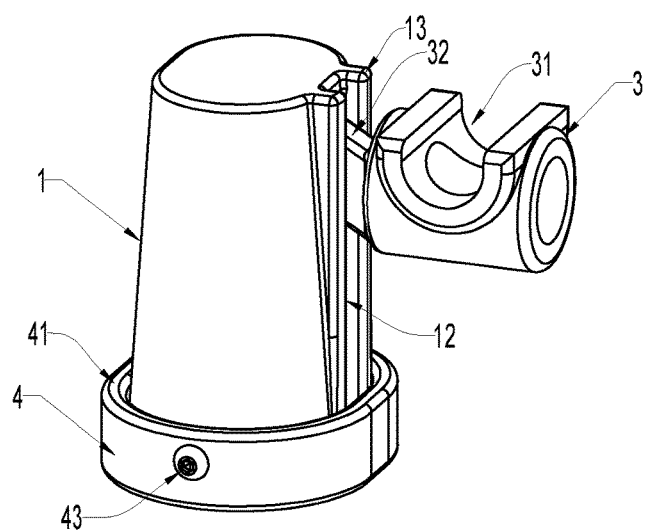
FIG. 4 is a perspective view of a spring-loaded leg, version 2.
Figure 5:
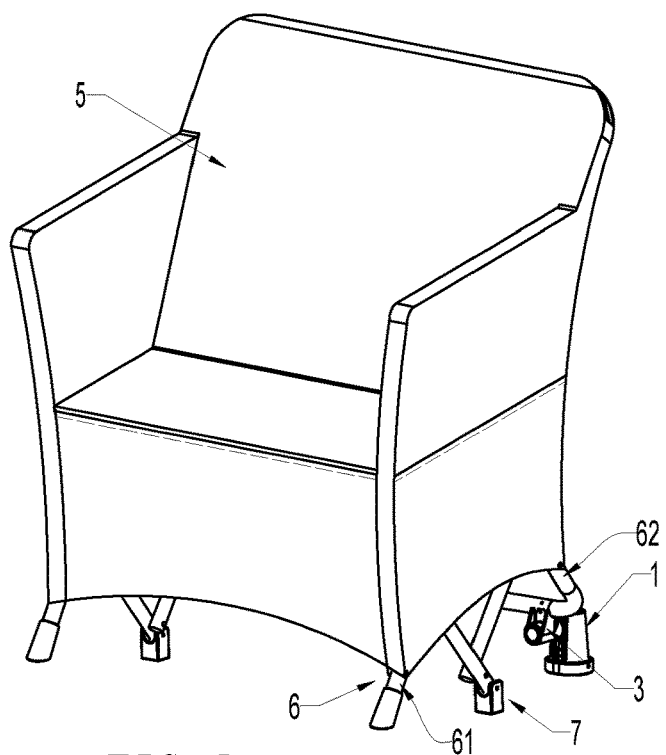
FIG. 5 is a diagram of rocking chair.

FIG. 4 displays another way to construct the foot sheath 31 attached to the connector. This embodiment ("version") has the sheath running horizontally, and is particularly suited for being locked onto the connecting component of the rear side of the chair frame. In other words, the actual structure of the foot sheath 31 is designed according to the different portions of the chair frame.

During assembly, the lower end of the spring 2 is inserted onto the protrusion 42 of the lower cap to maintain a centered structure, and the connector 32 and connection member 3 are inserted into the housing slide groove 12. The housing 1 is then snapped onto the upper end of the spring 2. The lower end of the housing 1 is snapped into the cap lips 41 of the lower cap and is secured by a screw 43 to complete the construction of the spring-loaded leg.

Additionally, the spring 2 is conical in shape, and the housing 1 chamber is correspondingly formed into a conical structure. There is adequate space within the middle of the chamber for the spring 2 and spring cap 33, which facilitates the proper expansion and contraction motions of the spring 2. Furthermore, the spring cap 33 of the connection member is formed with an inverted concave portion 331. The inverted concave portion 331 is affixed onto the top of the spring 2, thereby forming the assembled structure. The tension of the spring 2 presses the spring cap 33 against the top of the chamber 11 and supports the weight of the chair. The advantage of the conical spring is that it can interact with the protrusion 42 on the lower cap to achieve an automatic centering effect, especially when undergoing the pressure associated with angular change; secondly, it creates nested compression capacity in that when the height lowers upon compression, the resultant amplitude of the expansion will be greater. A space exists in the chamber 11 in the area of the spring cap 33, which allows the spring cap 33 to have adequate space to move without getting stuck or jammed. The design of the lip guide 13 not only reinforces the rigidity of the housing 1 but also ensures smooth cooperation between the connector 32 and the slide groove 12.

The following examples highlight application of the above spring-loaded leg on different types of chairs to enable the ordinary chair to achieve a rocking capacity.

Example 1

Referring to FIGS. 5-8, this rocking chair includes a chair frame, a seat fabric 5, and the above-mentioned spring-loaded legs; the spring-loaded legs are composed of a housing 1, a spring 2, a connection member 3, and a lower cap 4. A type of rocking chair composed of a chair frame and soft seat fabric. The chair frame has four sides, with the left and right side consisting of a support section 6 composed of corresponding or symmetrical bars. The two side support assemblies are interconnected by means of connecting components, which can serve to facilitate the opening and closing of the chair frame. The chair frame always has ground support on one end of the chair due to the spring-loaded legs, whether it be on the front end or the back end, or on the front or back end of each of the support sections 6 on each side. The chair frame is attached to the foot sheaths of the spring-loaded legs.

Figure 6:
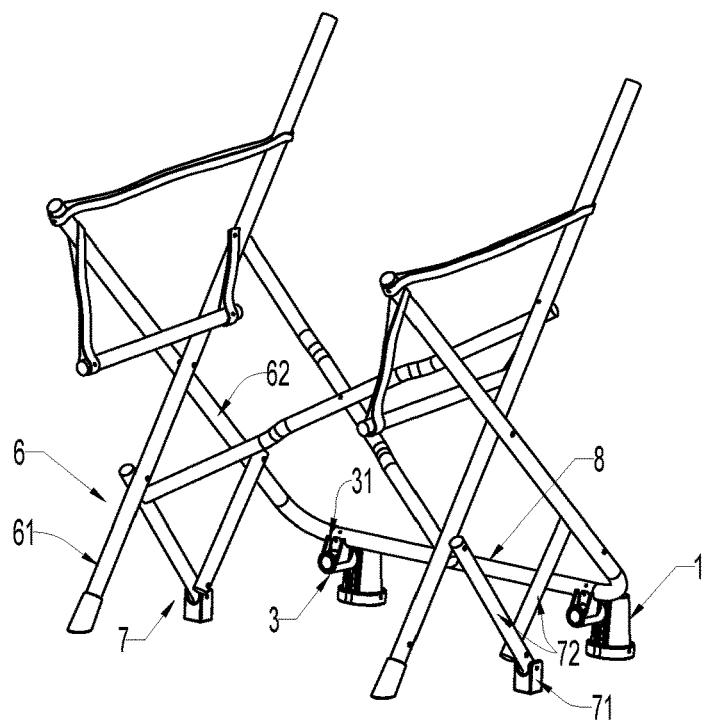
FIG. 6 is a perspective view of the rocking chair seat frame of FIG. 5.
Figure 7:
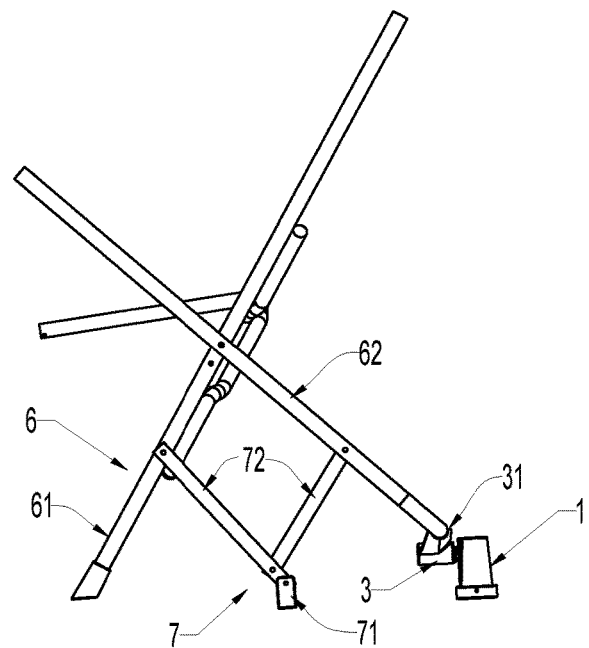
FIG. 7 is a side view of rocking chair seat frame.

This rocking chair prototype in the present example is a form of a front-to-back folding sofa. The support section 6 includes: a front leg bar 61 and a rear leg bar 62. The front leg bar 61 and the rear leg bar 62 are formed into an x-shaped cross-hinge; the spring-loaded leg is locked onto the lower end of at least one of the front leg bars 61 and the rear leg bar 62, or on the connecting assembly 8 on the lower end of the rear leg bars on both sides of the frame, or, in other words, on the back side of the frame, as shown in FIG. 6. This all depends on the structure of the actual chair being used. In the present example, the connecting component 8 and the rear leg bar 62 are bent into a U-shaped structure by a bar member, which allows the front and rear leg bars to be folded together.

The fulcrum assembly 7 is composed of two short bars 72 hinged together, with the end of one short bar 72 affixed the front leg bar 61, and the other affixed to the corresponding rear leg bar 62, thereby forming a quadrangular structure with the front and rear leg bars, 61 and 62. The opposing ends of the short bars 72 are affixed to the fulcrum point, which allows for the rocking movement of the chair frame. In order to avoid two short bars 72 from grinding on the ground or floor at the hinge point when the chair is in motion, a plastic pad 71 may be hinged at the hinge point. This plastic pad 71 touches the ground, and the rivet is then inserted to assist with the rocking motion of the chair at the point of the fulcrum.

As part of the design, the fulcrum assembly formed on the hinged ends of the two short bars 72 should be placed slightly forward from the center of gravity, or within a range of approximately 10 cm in front of the center of gravity.

Figure 8:
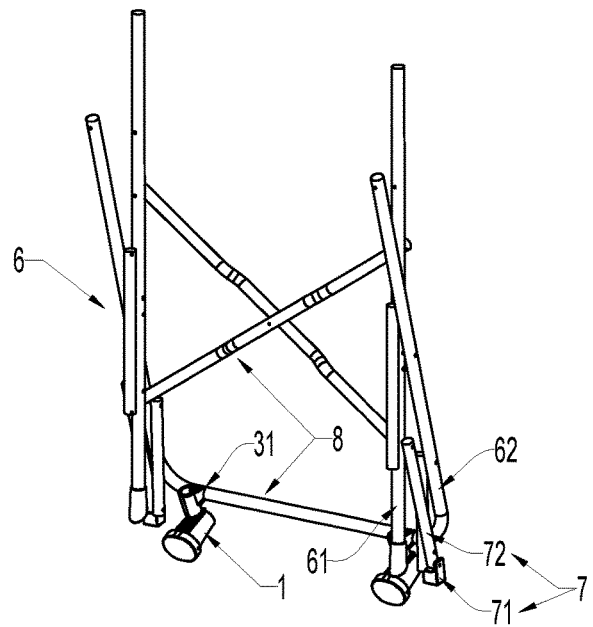
FIG. 8 is an alternate view of the rocking chair seat frame in collapsed position.

As shown in FIG. 8, after adding the spring-loaded leg and fulcrum assembly 7, the original folding sofa has rocking capacity and does not occupy too much space after being folded. When sitting back in the chair, one need only to move slightly away from the rocking fulcrum in order to achieve a rocking back and forth motion.

This example is also applicable to the four sides of the chair frame, which are formed by two intersecting bars in an x-shape hinged together, and each side is then hinged onto the adjacent side to form one quadrilateral body, which consists of a frame that can be folded and collapsed. This is the most common type of folding chair seen today, where each corner is affixed to the ground. The spring-loaded legs can be installed at two locations on either the front or back side. The structure of the fulcrum assembly 7 is the same as that of the present example, and the rocking function can also be achieved.

Example 2

Figure 9:
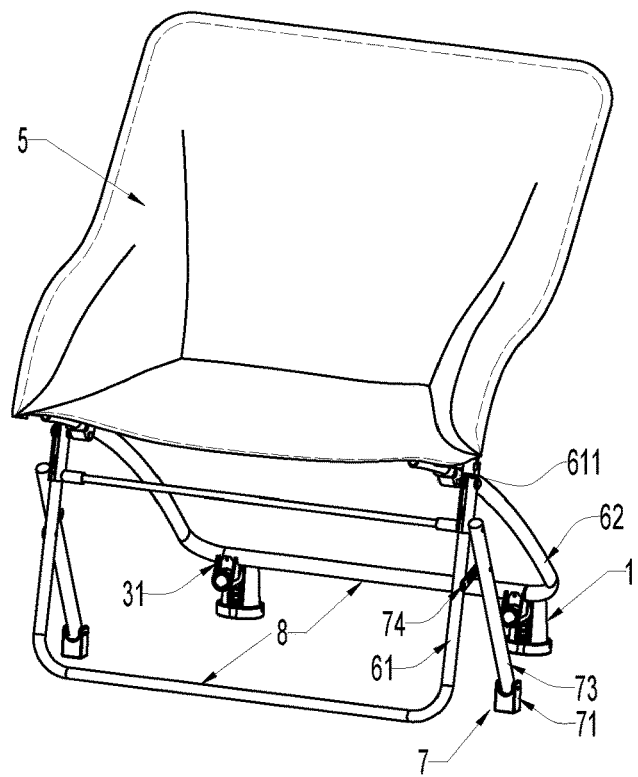
FIG. 9 is a diagram of rocking chair, version 2.
Figure 10:
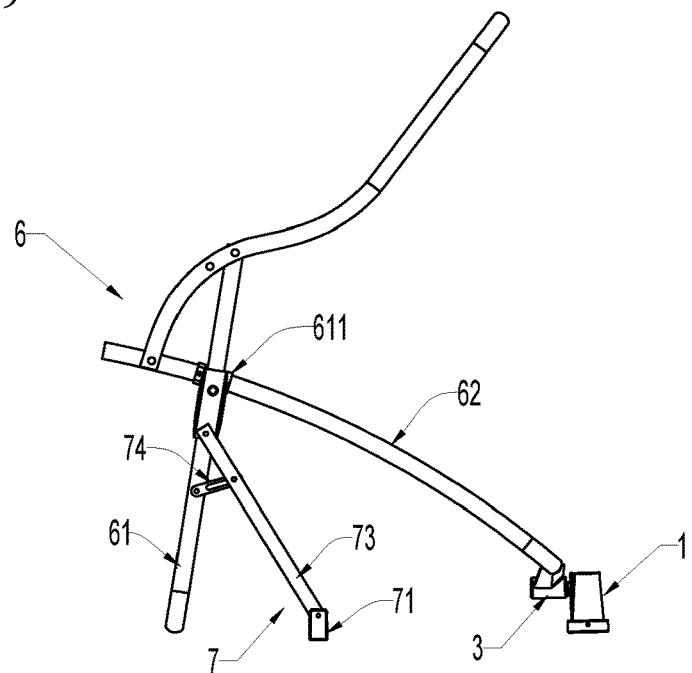
FIG. 10 is a side view of rocking chair seat frame, version 2.

Referring to FIG. 9 and FIG. 10, this rocking chair prototype is a form of a front-to-back folding sofa. The support section 6 includes: a front leg bar 61 and a rear leg bar 62. The middle portion of the front leg bar 61 is equipped with a slide housing 611, and the rear leg bar passes through this slide housing, thereby forming an X-shaped intersecting sliding structure, or in other words, the intersection point changes location along this slide housing when the structure is opened and closed. The spring-loaded leg is locked onto the lower portions of either the front leg bar 61 or rear leg bar 62 by means of the foot sheath 31 or can be affixed to the lower end of the rear leg bar 62 comprising the connecting component 8 structure. In this example, the connecting structure 8 and the rear leg bar 62 are combined and bent into a u-shaped structure.

The fulcrum assembly 7 is composed of a vertical bar 73, and this vertical bar 73 is hinged onto the upper middle portion of the front leg bar 61, and the hinge piece 74 is also attached to the near end of the vertical bar and hinged lower on the front leg bar 61, thereby forming a triangular structure. Alternatively, the upper end of the vertical bar 73 can be hinged onto the plastic pad of the front leg bar 61, which limits the angle in which the vertical bar 73 opens. When in the open position, the aforementioned vertical bar 73 is perpendicular to the floor, with the lower end forming a swinging fulcrum, which supports the swinging or rocking of the chair frame. In the same manner, a plastic pad 71 is also hinged onto the rocking fulcrum assembly to protect against grinding on the ground.

The above-mentioned hinge piece 74 can be applied as a single-piece structure, as shown in the figure; the hinge point of the vertical bar 73 or the front leg bar 61 contains a long groove so that the hinge point is able to move when folded. Alternatively, the hinge piece can consist of a structure of two pieces hinged together, or in other words, two plates hinged to each other that are hinged onto the front leg bar 61 at one end and hinged onto the vertical bar 73 on the other end. When the frame is folded, the two hinge plates can be hinged around each other at the point of the hinge.

In addition, the fulcrum assembly scheme in this example is also applicable to the folding sofa and the folding chair structure mentioned in the first example.

Example 3

Figure 11:
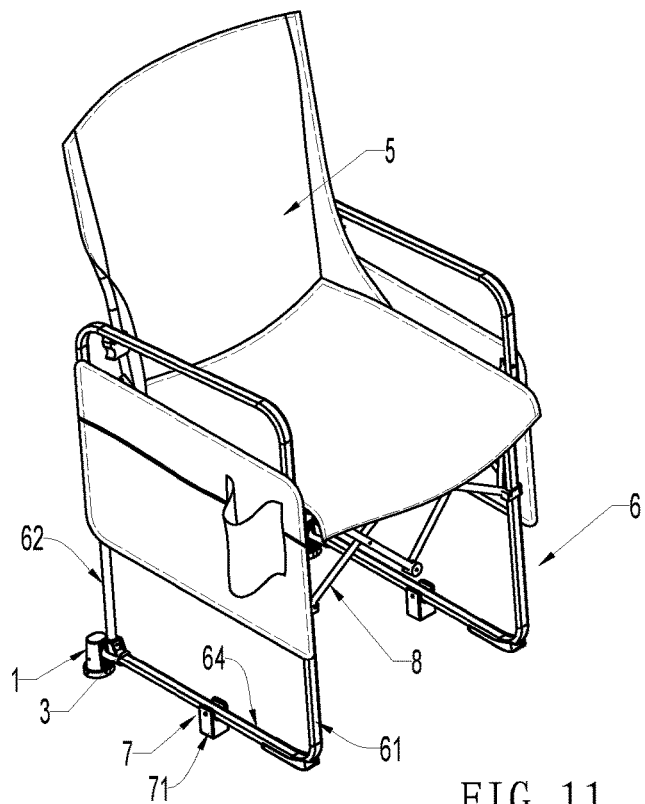
FIG. 11 is a diagram of rocking chair, version 3.
Figure 12:
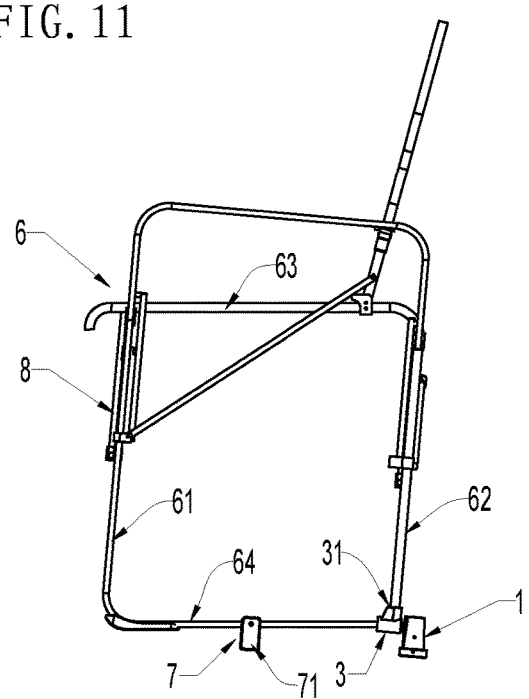
FIG. 12 is a side view of the rocking chair, version 3.

Referring to FIG. 11 and FIG. 12, this rocking chair prototype is a director chair that is folded from the left and right sides. The support section 6 includes a front leg bar 61, a rear leg bar 62, a cushion bar 63, and a ground bar 64, which altogether form a rectangular structure. The spring-loaded legs are locked onto either the front end portion or rear end portion of the ground bars 64 by means of the foot sheath 31. The fulcrum assembly 7 is composed of a plastic pad 71, and the plastic pad 71 is riveted onto the ground bar 64. In this middle position, the rivet constitutes the swinging fulcrum. In the present example, the connecting component 8 is composed of intersecting bars hinged together; it is possible to achieve the two side support sections 6 being folded together.

Example 4

Figure 13:
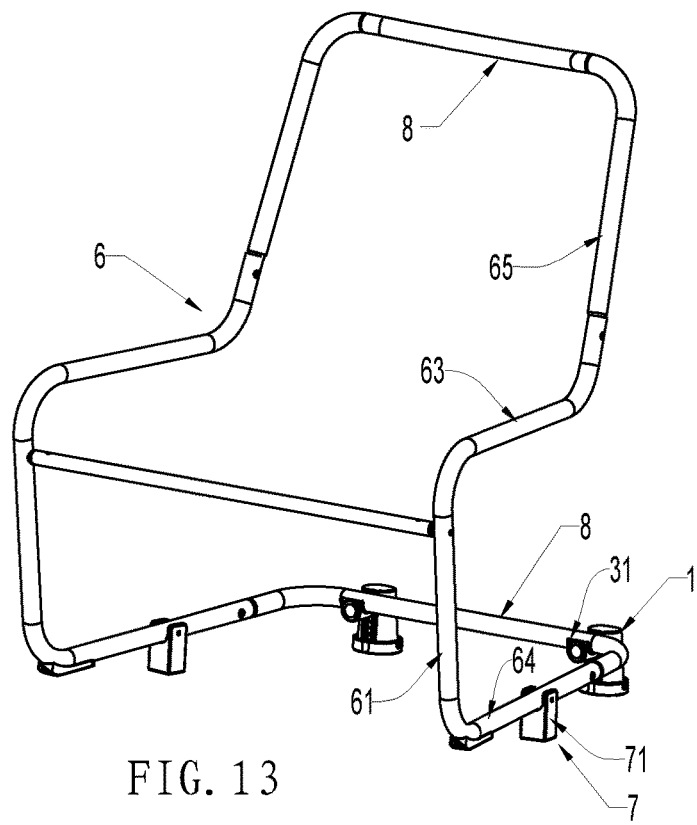
FIG. 13 is a diagram of rocking chair, version 4.
Figure 14:
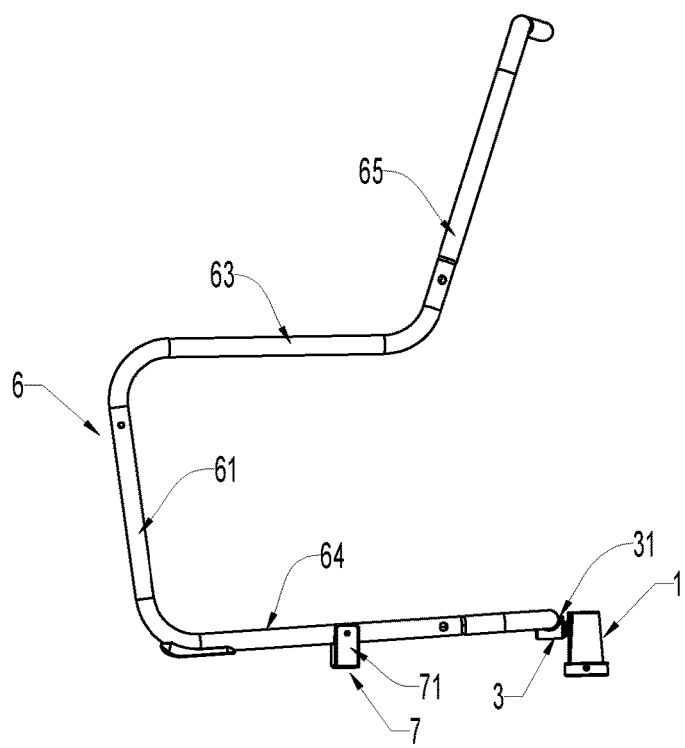
FIG. 14 is a side view of the rocking chair, version 4.

Referring to FIG. 13 and FIG. 14, this original rocking chair prototype is composed of a steel-pipe structure than can be dissembled. The support section 6 of this frame consists of the backrest bar 65, the cushion bar 63, the front leg bar 61 and the ground bar 64, which are connected in an open d-shaped structure. The rear portions of both the ground bar 64 and the backrest bar 65 are interconnected into one body via the connecting component 8. The spring-loaded leg is locked by means of the foot sheath 31 onto either the front or rear end portions of the ground bar 64, or it can be locked onto the connecting component 8 at the rear ends of the ground bars 64 on both sides. The fulcrum assembly 7 consists of a plastic pad 71, and the plastic pad 71 is riveted onto the middle section of the ground bar 64, and this rivet constitutes a swinging fulcrum.

We claim:

1. A spring-loaded leg rocking chair, including:
    A chair frame and a pair of spring loaded legs,
    each said spring loaded leg including a lower cap, a housing, and a spring;
    said housing comprised of a chamber opening and a slide groove, with said slide groove defines an opening in a side wall of chamber and said slide groove has a main axis parallel to the central axis of the chamber;
    said spring is located within the housing chamber and is secured within the housing chamber by means of the lower cap attached at a lower portion of the housing chamber and by a spring cap at an upper end of the housing chamber;
    A connecting member comprised of a foot sheath, a connector and said spring cap, the three of which form a rigid, interconnected structure;
    said spring cap being located within the housing chamber, wherein said spring is arranged to expand and contract substantially along a central axis of the housing chamber between the lower cap and the spring cap;
    said foot sheath being offset from said housing chamber by said connector such that said central axis of the housing chamber does not pass through any portion of the foot sheath;
    wherein said connector connecting said spring cap to said foot sheath passes through the slide groove; and
    wherein said foot sheath of each spring loaded leg is configured to securely receive a portion of a leg of the chair frame to form a spring-like support beneath the chair leg.

2. The spring-loaded leg rocking chair according to claim 1, wherein:
    The lower cap has outer lips that secure the lower cap to the housing, and a protrusion is formed on the center portion of the housing; wherein the lower end of the spring is then inserted onto the protrusion to maintain the centering of the spring within the chamber housing;
    wherein the connector portion of the connecting member is inserted into the housing slide groove and the housing itself is placed upside down over the upper end of the spring; and
    wherein the lower end of the housing is fastened to the lower cap by screws.

3. The spring-loaded leg rocking chair according to claim 2 wherein the spring is conical in shape, and at least a portion of the housing chamber has a conical structure to slidingly receive the conical spring.

4. The spring-loaded leg rocking chair according to claim 2, wherein a slide groove located on the housing is formed on both sides with a protruding lip guide.

5. A spring-loaded leg rocking chair according to claim 1, wherein the chair frame is attached to a soft seat fabric, and wherein the chair frame has four sides, including a front, back, right and life sides, and wherein the left and right sides consists of a support section composed of corresponding or symmetrical bars;
    and wherein the left and right side support assemblies are interconnected by means of connecting components, which can serve to facilitate the opening and closing of the chair frame; and
    said seat fabric being supported by the support section of the chair frame.

\* \* \* \* \*